United States Patent
Lewis et al.

(10) Patent No.: US 7,576,042 B2
(45) Date of Patent: Aug. 18, 2009

(54) SALT WATER STABLE LATEX CEMENT SLURRIES

(75) Inventors: Sam Lewis, Duncan, OK (US); Rickey Morgan, Duncan, OK (US); Christopher Gordon, Duncan, OK (US); Ashok K. Santra, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 411 days.

(21) Appl. No.: 11/364,092

(22) Filed: Feb. 28, 2006

(65) Prior Publication Data

US 2007/0203028 A1 Aug. 30, 2007

(51) Int. Cl.
C09K 8/588 (2006.01)
C09K 8/584 (2006.01)
C09K 8/60 (2006.01)
E21B 33/00 (2006.01)
E21B 33/13 (2006.01)
C04B 24/00 (2006.01)
C04B 24/16 (2006.01)
C04B 28/02 (2006.01)
C04B 28/04 (2006.01)

(52) U.S. Cl. ............... 507/221; 507/254; 507/261; 166/293; 166/295; 166/294; 166/724; 166/725; 524/3; 524/6; 524/8; 523/130

(58) Field of Classification Search ............... 507/221, 507/254, 261
See application file for complete search history.

(56) References Cited

U.S. PATENT DOCUMENTS

| | | | |
|---|---|---|---|
| 3,108,979 A | 10/1963 | Le Fevre et al. | |
| 3,399,159 A | 8/1968 | Samour | |
| 3,793,244 A | 2/1974 | Megee et al. | |
| 4,537,918 A * | 8/1985 | Parcevaux et al. | 523/130 |
| 4,560,736 A | 12/1985 | Pischke et al. | |
| 4,721,160 A * | 1/1988 | Parcevaux et al. | 166/293 |
| 4,767,460 A * | 8/1988 | Parcevaux et al. | 523/130 |
| 4,791,161 A | 12/1988 | Leising | |
| 4,861,822 A | 8/1989 | Keskey et al. | |
| 5,159,980 A | 11/1992 | Onan et al. | |
| 5,293,938 A | 3/1994 | Onan et al. | |
| 5,296,627 A | 3/1994 | Tang et al. | |
| 5,346,012 A | 9/1994 | Heathman et al. | |
| 5,401,786 A | 3/1995 | Gopalkrishnan | |
| 5,563,201 A | 10/1996 | Joanicot et al. | |
| 5,588,488 A * | 12/1996 | Vijn et al. | 166/293 |
| 5,588,489 A | 12/1996 | Chatterji et al. | |
| 5,688,844 A | 11/1997 | Chatterji et al. | |
| 5,697,443 A | 12/1997 | Brezinski et al. | |
| 5,795,924 A | 8/1998 | Chatterji et al. | |
| 5,820,670 A | 10/1998 | Chatterji et al. | |
| 5,900,451 A | 5/1999 | Krishnan et al. | |
| 5,913,364 A | 6/1999 | Sweatman | |
| 6,130,287 A | 10/2000 | Krishnan | |
| 6,167,967 B1 | 1/2001 | Sweatman | |
| 6,258,757 B1 | 7/2001 | Sweatman et al. | |
| 6,508,306 B1 | 1/2003 | Reddy et al. | |
| 2005/0167106 A1 | 8/2005 | Reddy et al. | |
| 2005/0230112 A1 | 10/2005 | Reddy et al. | |

FOREIGN PATENT DOCUMENTS

EP 0 816 302 A2 6/1997

OTHER PUBLICATIONS

Halliburton brochure entitled "Cementing Stabilizer 434 C Latex Stabilizer" dated 2005.
Halliburton brochure entitled "Cementing Stabilizer 434 B Latex Stabilizer" dated 2005.
Chatterji, Jiten et al., "Improved Resilient Cement Compositions and Methods of Cementing" filed Feb. 4, 2005, as U.S. Appl. No. 11/051,957.
Chatterji, Jiten et al., "Improved Resilient Cement Compositions and Methods of Cementing" filed Feb. 4, 2005, as U.S. Appl. No. 11/051,020.
Reddy, B. Raghava et al., "Oil Well Sealant Compositions Comprising Alkali Swellable Latex" filed Dec. 8, 2004 as U.S. Appl. No. 11/010,117.
Dalrymple, E. Dwyann et al., "A Sealant Composition Comprising A Gel System and a Reduced Amount of Cement for . . . " filed Jan. 19, 2006 as U.S. Appl. No. 11/335,134.
Gonsveld, Jan et al., "Methods of Plugging A Permeable Zone Downhole Using A Sealant Composition Comprising . . . " filed Jan. 24, 2005 as U.S. Appl. No. 11/041,577.
Gonsveld, Jan et al., "A Sealant Composition Comprising A Crosslinkable Material And A Reduced Amount of Cement . . . " filed Jan. 24, 2005 as U.S. Appl. No. 11/041,554.

* cited by examiner

Primary Examiner—Timothy J Kugel
Assistant Examiner—Atnaf Admasu
(74) Attorney, Agent, or Firm—Craig W. Roddy; Conley Rose, P.C.

(57) ABSTRACT

A method of servicing a wellbore comprising preparing a cement slurry by premixing at least one latex, at least one stabilizer, and optionally water to form a homogeneous solution, further mixing the homogeneous solution with an ionic compound, cement, and optionally additional water to form the slurry, and placing the slurry in the wellbore. A method of stabilizing latex in cement slurry containing saltwater, comprising premixing the latex with a stabilizer until a homogenous solution forms prior to contacting the latex with the saltwater. A cement slurry comprising a latex, a stabilizer, a cement, an ionic compound, and water wherein the latex and stabilizer are contacted prior to contact of the latex with the ionic compound.

21 Claims, No Drawings

SALT WATER STABLE LATEX CEMENT SLURRIES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to servicing a wellbore. More specifically, it relates to servicing a wellbore with latex cement slurries containing salt and methods of using same.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Sealant compositions for use in wellbore servicing may contain modifiers to enhance the mechanical properties of the sealant. Latex emulsions, which may contain a stable water-insoluble, polymeric colloidal suspension in an aqueous solution, are commonly used in sealant compositions to improve the properties of those compositions. For example, latex emulsions are used in cement compositions to reduce the loss of fluid there from and to reduce the cement's permeability to gas thereby substantially increasing the cement's resistance to gas flow from a gas-bearing formation. Latex emulsions are also employed to reduce the brittleness and improve the flexibility of sealant compositions; otherwise, the compositions may shatter under the impacts and shocks generated by drilling and other well operations.

The use of latex emulsions in sealant compositions may have some disadvantages. For example, cement slurries containing a latex emulsion when subjected to a salt solution often coagulate to form a gelled mixture that is unsuitable for use as a sealant composition. Thus, a need exists for saltwater stable cement slurries containing a latex and methods of preparing same.

BRIEF SUMMARY OF SOME OF THE PREFERRED EMBODIMENTS

Disclosed herein is a method of servicing a wellbore comprising preparing a cement slurry by premixing at least one latex, at least one stabilizer, and optionally water to form a homogeneous solution, further mixing the homogeneous solution with an ionic compound, cement, and optionally additional water to form the slurry, and placing the slurry in the wellbore.

Also disclosed herein is a method of stabilizing latex in cement slurry containing saltwater, comprising premixing the latex with a stabilizer until a homogenous solution forms prior to contacting the latex with the saltwater.

Further disclosed herein is a cement slurry comprising a latex, a stabilizer, a cement, an ionic compound, and water wherein the latex and stabilizer are contacted prior to contact of the latex with the ionic compound.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

Disclosed herein are a system and methods for producing a cement slurry comprising cement, latex, water, and ionic compound (e.g., salt), referred to herein as a saltwater stable latex cement slurry (SWLC). Such SWLCs further comprise a stabilizer as will be described in more detail herein. SWLCs may be prepared through the ordered mixing of slurry components to provide a sealant composition that is pumpable and displays mechanical properties as desired by the user such as a desirable thickening time and compressive strength.

In an embodiment, the SWLC may be prepared by premixing the latex and stabilizer for a time sufficient to form a homogenous solution, and wherein the premixed latex/stabilizer solution is formed prior to contact of the latex with the ionic compound, and in particular prior to contact of the latex with a salt solution such as saltwater (e.g., ocean or sea water). For example, the latex and stabilizer may be premixed to form a homogenous solution and then added to a solution comprising a salt such as seawater. Alternatively, the latex and stabilizer may be premixed to form a homogeneous solution and then added to fresh water solution. Salt in solution or as a dry solid may then be added to the solution. In such embodiments, the premixing of the latex and stabilizer prior to the introduction of a salt or salt solution may prevent the inversion of the latex in solution and thus enhance the mechanical properties of the composition.

The latex and stabilizer may be premixed using any mixing device compatible with the composition, for example a bulk mixer. As will be understood by one of ordinary skill in the art, the time necessary for formation of a homogenous solution may depend on factors such as the ratio of latex:stabilizer, the temperature, and the type of mixing device utilized.

In an embodiment, the stabilizer is present in an amount of from about 2% to about 90% by weight of latex, alternatively from about 5% to about 90% by weight of latex, alternatively, from about 10% to about 90% by weight of latex, alternatively from about 10% to about 50% by weight of latex, alternatively from about 10% to about 25% by weight of latex, alternatively from about 15% to about 25% by weight of latex, or alternatively about 20% by weight of latex. In an embodiment, the final salt concentration (w/v) may range from an amount of from about 0.1% to saturation.

Following the formation of a homogeneous solution of latex and stabilizer the other components of the SWLC may be introduced and mixed to form the SWLC. For example, the homogeneous solution of latex and stabilizer may be contacted with saltwater and cement to form a SWLC. Alternatively, the homogeneous solution of latex and stabilizer may be contacted with fresh water, cement, and solid salt (e.g., a premix of dry cement and solid salt) to form a SWLC. In an embodiment, the homogeneous solution of latex and stabilizer may be initially contacted with fresh water followed by cement and solid salt (e.g., a premix of dry cement and solid salt) and optionally additional fresh and/or saltwater.

In an embodiment, the SWLC comprises a latex further comprising a styrene/butadiene copolymer suspended in water to form an aqueous emulsion. Examples of suitable latexes are described in U.S. Pat. No. 5,688,844, which is incorporated by reference herein in its entirety. LATEX 2000 emulsion is a styrene/butadiene copolymer latex commercially available from Halliburton Energy Services. The weight ratio of the styrene to butadiene in LATEX 2000 emulsion is about 25:75, and the amount of the copolymer in the LATEX 2000 emulsion is about 50% by weight of the aqueous emulsion. In an embodiment, the weight ratio of the styrene to butadiene is about 1:99, alternatively about 10:90, alternatively 20:80, alternatively 30:70, alternatively 40:60 alternatively, 50:50, alternatively 60:40, alternatively 70:30, alternatively 80:20, alternatively 90:10, alternatively 99:1. Alternatively, the latex may comprise 100% styrene.

In an embodiment, the SWLC comprises a colloidally stabilized latex. As used herein, "colloidally stabilized latex" refers to a latex comprising polymer particles suspended in an aqueous solution and at least one protective colloid for providing stabilization to the colloidal polymer emulsion.

Protective colloids known in the art may be employed in the colloidally stabilized latex. Examples of suitable protective colloids include, but are not limited to, partially and fully hydrolyzed polyvinyl alcohols, cellulose ethers such as hydroxymethyl cellulose, hydroxyethyl cellulose, hydroxypropyl cellulose, starch and starch derivatives, and carboxymethyl cellulose, natural and synthetic gums such as gum tragacanth and gum arabic, polyacrylic acid, acrylates, poly(vinyl alcohol)co(vinyl amine)copolymers, and combinations thereof.

Examples of suitable colloidally stabilized latexes for use in the disclosed gel systems, and methods of making such latexes, are described in U.S. Pat. Nos. 5,900,451 and 6,130,287, both of which are incorporated by reference herein in their entirety. In those patents, the colloidally stabilized latexes are referred to as "stabilized emulsion polymers." In addition, examples of suitable commercially available colloidally stabilized latexes include BS 2100 latex, which is a carboxylated butadiene acrylonitrile latex available from Dow Reichhold Inc. As would be recognized by one skilled in the art, the dry form of such colloidally stabilized latexes may also be employed.

In an embodiment, the polymer contained in a colloidally stabilized latex may include an aliphatic conjugated diene monomer and a at least one additional monomer comprising a non-aromatic unsaturated mono- or di-carboxylic ester monomer, an aromatic unsaturated monomer, at least one nitrogen-containing monomer, or combinations thereof. Examples of suitable aliphatic conjugated diene monomers include $C_4$ to $C_9$ dienes such as butadiene monomers, e.g., 1,3-butadiene, 2-methyl-1,3-butadiene, 2 chloro-1,3 butadiene, 2-methyl-1,3-butadiene, and 2 chloro-1,3-butadiene. Blends or copolymers of the diene monomers may also be used. Examples of suitable non-aromatic unsaturated monocarboxylic ester monomers include acrylates, methacrylates, and combinations thereof. The acrylates and methacrylates may include functional groups such as amino groups, hydroxy groups, and epoxy groups. Examples of suitable non-aromatic unsaturated dicarboxylic ester monomers include alkyl and dialkyl fumarates, itaconates, maleates, and combinations thereof, with the alkyl group having from one to eight carbons. In an embodiment, a non-aromatic unsaturated monocarboxylic ester monomer employed in the colloidally stabilized latex is methyl methacrylate. Examples of suitable aromatic unsaturated monomers include styrene and styrene derivatives such as alphamethylstyrene, p-methyl styrene, divinyl benzene, vinyltoluene, divinyl toluene, ethylstyrene, tert-butyl styrene, monochlorostyrene, dichlorostyrene, vinyl benzyl chloride, fluorostyrene, alkoxystyrenes (e.g., paramethoxystyrene), and combinations thereof. In a preferred embodiment, an aromatic unsaturated monomer included in the colloidally stabilized latex is styrene. Examples of suitable nitrogen-containing monomers include acrylonitrile, methacrylonitrile, acrylamide, methacrylamide, N-methylolacrylamide, alkylated N-methylolacrylamides such as N-methoxymethylacrylamide and N-butoxymethylacrylamide, and combinations thereof. In a preferred embodiment, a nitrogen-containing monomer included in the colloidally stabilized latex is acrylonitrile.

In certain embodiments, the colloidally stabilized latex also includes a surfactant having ethylenic unsaturation, an oxyalkylene functional monomer, or combinations thereof, incorporated in the backbone of the polymer. The surfactant is copolymerized with the aliphatic conjugated diene monomer and the additional monomer and is preferably located at the surface of the polymer particles. Since the surfactant is an integral part of the polymer, it most likely cannot desorb from the polymer. Examples of suitable surfactants are disclosed in U.S. Pat. No. 5,296,627, which is incorporated by reference herein in its entirety. The surfactant preferably has a hydrophobic portion that possesses terminal ethylenic unsaturation and a hydrophilic portion that contains a poly(alkyleneoxy) segment. Examples of suitable oxyalkylene functional monomers include monoesters of carboxylic acid or dicarboxylic acid, diesters of dicarboxylic acid, compounds generally represented by the following formulas, and combinations thereof:

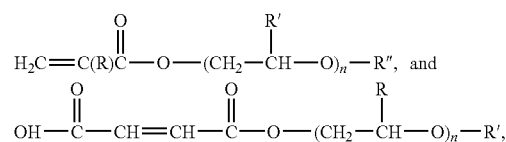

where R is hydrogen or a $C_1$-$C_4$ alkyl, R' is hydrogen or a $C_1$-$C_4$ alkyl, R" is hydrogen or a $C_1$-$C_4$ alkyl, and n is in a range of from 1 to 30. The oxyalkylene functional monomer is copolymerized with the aliphatic conjugated diene monomer and the additional monomer. Additional examples of surfactants and oxyalkylene functional monomers that may be employed in the colloidally stabilized latex are provided in aforementioned U.S. Pat. No. 5,900,451.

In the foregoing embodiment in which the colloidally stabilized latex includes a surfactant having ethylenic unsaturation and/or an oxyalkylene functional monomer, the amount of protective colloid present in the colloidally stabilized latex is preferably in the range of from about 0.1 percent (hereinafter "%") to about 10% by total weight of the starting monomers, more preferably from about 1% to about 8%, and most preferably from about 2% to about 6%. The amount of aliphatic conjugated diene monomer present in the colloidally stabilized latex is preferably in the range of from about 5% to about 95% by total weight of the starting monomers, more preferably from about 20% to about 80%. The amount of non-aromatic unsaturated mono- or di-carboxylic ester monomer present in the colloidally stabilized latex is preferably in the range of from about 5% to about 95% by total weight of the starting monomers, more preferably from about 20% to about 80%. The amount of aromatic unsaturated monomer present in the colloidally stabilized latex is preferably in the range of from about 5% to about 95% by total weight of the starting monomers, more preferably from about 20% to about 80%. The amount of nitrogen-containing monomer present in the colloidally stabilized latex is preferably in the range of from about 5% to about 95% by total weight of the starting monomers, more preferably from about 20% to about 80%. The amount of surfactant present in the colloidally stabilized latex is preferably in the range of from about 0.1% to about 5% by total weight of the starting monomers, more preferably from about 1% to about 4%, and most preferably from about 2% to about 3%. The amount of oxyalkylene functional monomer present in the colloidally stabilized latex is preferably in the range of from about 0.1% to about 7% by total weight of the starting monomers, more preferably from about 1% to about 3%. When the surfactant and the oxyalkylene functional monomer are both used, the colloidally stabilized latex preferably contains from about 0.5% to about 2% of the surfactant and from about 1% to about 3% of the oxyalkylene functional monomer by total weight of the starting monomers.

In another embodiment, the colloidally stabilized latex includes a functionalized silane incorporated in the polymer that is capable of adsorbing the protective colloid. Examples of suitable functionalized silanes are generally represented by the following formula

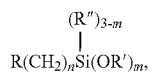

where R" is a $C_1$ to $C_5$ alkyl, R' is a $C_1$ to $C_5$ alkyl, R is SH, $CH_2=CH-$, $CH_2=C(CH_3)-C(O)O-$, $CH_2=CH-C(O)O-$, and

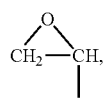

and where n is in a range of from 1 to 10, and m is 2 or 3. A preferred functionalized silane is gamma mercaptopropyl trimethoxy silane in which R is SH, R' is $C_1$ alkyl, n is 3, and m is 3. Unsaturated mono- or di-carboxylic acid monomers and derivatives thereof, such as acrylic acid, methacrylic acid, itaconic acid, fumaric acid, and malieic acid, may also be employed in the colloidally stabilized latex. Additional examples of surfactants and oxyalkylnlene functional monomers that may be employed in the colloidally stabilized latex are provided in aforementioned U.S. Pat. No. 6,130,287. In the foregoing embodiment in which the colloidally stabilized latex includes a functionalized silane, the amount of protective colloid present in the latex is preferably in the range of from about 1 percent (hereinafter "%") to about 10% by total weight of the starting monomers. The amount of aliphatic conjugated diene monomer present in the colloidally stabilized latex is preferably in the range of from about 1% to about 99% by total weight of the starting monomers, more preferably from about 10% to about 70%, and most preferably from about 20% to about 50%. The amount of non-aromatic unsaturated mono- or di-carboxylic ester monomer present in the colloidally stabilized latex is preferably in the range from about 1% to about 99% by total weight of the starting monomers, more preferably from about 50% to about 80%. The functionalized silane may be present in the colloidally stabilized latex in various amounts. For example, the amount of silane present in the polymer may range from about 0.01% to about 2% by total weight of the starting monomers, preferably about 0.5%.

In yet another embodiment, when the colloidally stabilized latex composition contains cross-linkable monomers such as N-methylolacrylamide and alkylated N-methylolacrylamides such as N-methoxymethylacrylamide and N-butoxymethylacrylamide, appropriate acidic catalysts may be included in the latex to serve as crosslinking agents. Such acidic catalysts provide for the formation of a resilient rubbery mass. Examples of suitable acidic catalysts include paratoluene sulfonic acid, an ammonium salt such as ammonium sulfate, ammonium chloride, ammonium acetate, and combinations thereof. In an embodiment in which the colloidally stabilized latex contains both a vulcanizable monomer and a crosslinkable monomer, it may further include a vulcanizing agent in addition to the acidic catalyst. In another embodiment, the colloidally stabilized latex may include thermosetting resins such as melamine-formaldehyde derived resins and urea-formaldehyde resins that are capable of participating in the crosslinking reactions in the presence of the acidic catalysts.

The colloidally stabilized latex gel systems may also include salts of monovalent (e.g., $Na^+$), divalent (e.g., $Ca^{2+}$), and trivalent cations. In an embodiment, the compositions are saturated with such salts to ensure that they do not wash out or dissolve salt zones located in the subterranean formation. The colloidally stabilized latex has a relatively high tolerance to salts. Thus, it desirably remains stable in the presence of the salts contained in the sealant compositions and in the presence of salts that it may encounter in the wellbore without the need to introduce additional stabilizing surfactants, e.g., ethyoxylated nonylphenol surfactant, to the sealant compositions. It is understood that, if desired, such stabilizing surfactants still may be employed in the sealant compositions and may be distinguished from ethylenically unsaturated surfactants incorporated in the backbone of the latex polymer.

In an embodiment, the colloidally stabilized latex gel system may include the following components: vulcanizable groups such as the diene type of monomers discussed above, e.g., butadiene; vulcanizing agents such as sulfur, 2,2'-dithiobisbenzothiazole, organic peroxides, azo compounds, alkylthiuram disulfides, and selenium phenolic derivatives; vulcanization accelerators such as fatty acids such as stearic acid, metallic oxides such as zinc oxide, aldehyhde amine compounds, guanidine compound, and disulfide thiuram compounds; vulcanization retarders such as salicylic acid, sodium acetate, phthalic anhydride, and N-cyclohexyl thiophthalimide; defoamers; fillers to increase or decrease the treatment density as required; or combinations thereof. Additional disclosure regarding suitable latexes containing such materials can be found in U.S. Pat. Nos. 5,293,938 and 5,159,980, each of which is incorporated by reference herein in its entirety. Additional disclosure re colloidally stabilized latex gel systems may be found in U.S. Pat. App. Pub. No. 2005/0230112A1, which is incorporated by reference herein in its entirety.

In an embodiment, the SWLC comprises an alkali swellable latex and at least one pH increasing material. In embodiments, the pH increasing material is a compound capable of increasing the pH of the sealant composition to about 7 or higher. The pH increasing material can be a base-producing material, a cement, or combinations thereof.

"Alkali swellable latex" is defined as a latex emulsion that, when exposed to pH increasing materials, may swell and exhibit an increase in viscosity. Alkali swellable latexes typically contain, in addition to typical latex forming monomers, other monomers having acidic groups capable of reacting with pH increasing materials, thereby forming anionic pendant groups on the polymer back bone. Examples of typical latex forming monomers that may be used to make alkali swellable latexes include, without limitation, vinyl aromatic monomers (e.g., styrene based monomers), ethylene, butadiene, vinylnitrile (e.g., acrylonitrile), olefinically unsaturated esters of $C_1$-$C_8$ alcohol, or combinations thereof. In some embodiments, non-ionic monomers that exhibit steric effects and that contain long ethoxylate or hydrocarbon tails may also be present.

Monomers containing acid groups capable of reacting with pH increasing materials include ethylenically unsaturated monomers having at least one carboxylic acid functional group. Without limitation, examples of such carboxylic acid containing groups include acrylic acid, alkyl acrylic acids, such as methacrylic acid and ethacrylic acid, alpha-chloro-acrylic acid, alpha-cyano acrylic acid, alpha-chloro-methacrylic acid, alpha-cyano methacrylic acid, crotonic acid, alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, or combinations thereof. In some embodiments, the carboxylic acid containing groups include itaconic acid, acrylic acid, or combinations thereof.

Preparation of alkali swellable latexes is discussed in U.S. Pat. Nos. 3,793,244; 4,861,822; and 5,563,201, which are incorporated herein by reference in their entirety. Without limitation, examples of suitable commercially available alkali swellable latexes include TYCHEM 68710, available from Dow Reichhold Specialty Latex LLC; ACRYSOL TT 615, available from Rohm and Haas; SN THICKENERs 920, 922, 924, 634 and 636, available from San Napco Limited, Sanyo Chemical Industry, Japan; ALCOGUM SL-120, available from Alco Chemical, a National Starch Company; HEUR-ASE P206, available from Dow Chemical Company; ADCOTE 37-220, available from Rohm and Haas Company; and JETSIZE AE-75, available from Eka Chemicals.

An alkali swellable latex may contain crosslinking agents that are suitable for facilitating the formation of a resilient rubbery mass, which may be used during the polymerization stage of the monomers or added to the latex prior to use (for example to the sealant composition). In embodiments wherein the alkali swellable latex contains vulcanizable groups, such as the diene type of monomers, crosslinking agents including vulcanizing agents such as sulfur, 2,2'-dithiobisbenzothiazole, organic peroxides, azo compounds, alkylthiuram disulfides, selenium phenolic derivatives and the like; vulcanization accelerators such as fatty acids (e.g., stearic acid), metallic oxides (e.g., zinc oxide), aldehyde amine compounds, guanidine compounds, disulfide thiuram compounds, and the like; vulcanization retarders such as salicylic acid, sodium acetate, phthalic anhydride and N-cyclohexyl thiophthalimide; defoamers; or combinations thereof, may be added just prior to use, for instance to a sealant composition. Such compositions are discussed in U.S. Pat. No. 5,293,938, which is incorporated by reference herein in its entirety. If the crosslinking agent is used during production of the latex, it may be a multifunctional monomer with more than one polymerizable group, for example—divinylbenzene, trimethylolpropane triacrylate, tetraethyleneglycol diacrylate, methylene bisacrylamide, and the like.

A base-producing material includes any compound capable of generating hydroxyl ions (OH—) in water to react with or neutralize an acid to from a salt. It is to be understood that the base-producing material can include chemicals that produce a base when reacted together. Without limitation, examples include reaction of an oxide with water. In one embodiment, the base-producing material has at least partial solubility in water, for example a solubility of 1% or greater in water. Examples of suitable base-producing materials include without limitation ammonium, alkali and alkali earth metal carbonates and bicarbonates, alkali and alkali earth metal hydroxides, alkali and alkali earth metal oxides, alkali and alkali earth metal phosphates and hydrogen phosphates, alkali and alkaline earth metal sulphides, alkali and alkaline earth metal salts of silicates and aluminates, water soluble or water dispersible organic amines, polymeric amines, amino alcohols, or combinations thereof. Without limitation, examples of suitable alkali and alkali earth metal carbonates and bicarbonates include $Na_2CO_3$, $K_2CO_3$, $CaCO_3$, $MgCO_3$, $NaHCO_3$, $KHCO_3$, ethanolamine and triethanolamine. It is to be understood that when carbonate and bicarbonate salts are used as base-producing material, a byproduct may be carbon dioxide, which may enhance the mechanical properties of the non-cement based sealant composition. Examples of suitable alkali and alkali earth metal hydroxides include, without limitation, NaOH, $NH_4OH$, KOH, LiOH, and $Mg(OH)_2$. Examples of suitable alkali and alkali earth metal oxides include, without limitation, BaO, SrO, $Li_2O$, CaO, $Na_2O$, $K_2O$, and MgO. Examples of suitable alkali and alkali earth metal phosphates and hydrogen phosphates include, without limitation, $Na_3PO_4$, $Ca_3(PO_4)_2$, $CaHPO_4$, and $KH_2PO_4$. Examples of suitable alkali and alkaline earth metal sulphides include, without limitation, $Na_2S$, CaS, SrS, and the like. Suitable silicate salts include, without limitation, sodium silicate, potassium silicate, and sodium metasilicate. Examples of suitable aluminate salts include, without limitation, sodium aluminate and calcium aluminate. FLOWCHECK and ECONOLITE are examples of commercial silicates available from Halliburton Energy Services, Inc. VERSASET alkali metal aluminate is a sodium aluminate that is commercially available from Halliburton Energy Services, Inc. Examples of organic amines include without limitation polymeric amines, monomeric amines containing one or more amine groups, and oligomeric amines. The organic amines may be completely or partially soluble in water. The organic amines may also be dissolved in an organic fluid such as those used as base oils in non-aqueous drilling fluids such as hydrocarbons and esters. Examples of suitable water soluble or water dispersible amines include triethylamine, aniline, dimethylaniline, ethylenediamine, diethylene triamine, cyclohexylamine, diethyltoluene diamine, 2,4,6-tridimethylaminomethylphenol, isophoroneamine, and the like. STRATALOCK D, STRATALOCK E, and STRATALOCK B are organic amines commercially available from Halliburton Energy Services, Inc.; JEFFAMINE is an organic amine commercially available from Huntsman Corp. of Austin, Tex.; and EH-101, EH-102, EH-103 and EH-104 are organic amines commercially available from Applied Poleramic of Bernicia, Calif. Examples of suitable polymeric amines include chitosan, polylysine, poly(dimethylaminoethylmethacrylate), poly(ethyleneimine), poly(vinylamine-co-vinylalcohol), poly(vinylamine) and the like. LUPAMIN is a poly(ethyleneimine) available commercially from BASF AG Corporation, Ludwigshafen, Germany. CHITOCLEAR is an example of chitosan that is commercially available from Primex/anson Halosource of Redmond, Va. LUPAMIN is a formylated poly(vinylamine) commercially available from BASF AG Corporation. Examples of amino alcohols include ethanolamine, triethanolamine, tripropanolamine and the like.

In other embodiments, the base-producing material may comprise a resin such as thermosetting resins. Examples of suitable thermosetting resins include but are not limited to amino resins such as melamine-formaldehyde resins and urea-formaldehyde resins, phenolic resins such as phenol formaldehyde resins, furfural resins, or combinations thereof. With the amino resins, acid catalysts such as ammonium salts or organic acids such as p-toluene sulfonic acids may be used. Due to the acidic nature of the alkali swellable latex and the basic nature of amino resins, the amino resin can function as a base-producing material to swell the latex and in the process become polymerized to form a thermoset polymer, thus imparting additional strength to the sealant composition for example in loss-circulation treatments. To prevent undesired premature swelling and polymerization, the latex and amino resin are pumped separately and allowed to contact in the desired zone downhole. The resin compositions with traditional latexes and methods are discussed in U.S. Pat. No. 6,508,306, which is incorporated by reference herein in its entirety.

In alternative embodiments, the pH increasing material comprises a low pH cement composition (for example a high alumina cement) and a base-producing material. In such embodiments, an effective amount of cement composition and base-producing material can be contacted with the alkali swellable latex to increase the pH of the sealant composition.

Additional disclosure on gel systems comprising alkali swellable latex and at least one pH increasing material may be found in U.S. patent application Ser. No. 11/010,117 filed on Dec. 7, 2004 and entitled "Oilwell Sealant Compositions Comprising Alkali Swellable Latex," which is incorporated herein by reference in its entirety.

In an embodiment, SWLC comprises a latex comprising at least one polar monomer and at least one elasticity enhancing monomer. According to certain embodiments, the latex further comprises at least one stiffness enhancing monomer. The latexes (polymer emulsions) used in these embodiments are water emulsions of a rubber or plastic obtained by a polymerization process.

According to the embodiments illustrated herein, the polar monomer may be selected from vinylamine, vinyl acetate, acrylonitrile, or acid, ester, amide, or salt forms of acrylates, such as acrylic acid; and the elasticity enhancing monomer may be selected from ethylene, propylene, butadiene, 1,3-hexadiene or isoprene. In the embodiments that include a stiffness enhancing monomer, the stiffness enhancing monomer may be selected from styrene, t-butylstyrene, α-methylstyrene or sulfonated styrene.

Additional disclosure on gel systems including a latex comprising at least one polar monomer and at least one elasticity enhancing monomer may be found in U.S. patent application Pub. No. 2005/0167106A1, which is incorporated herein by reference in its entirety.

In an embodiment, the SWLC comprises a cationic latex. Cationic latexes may comprise latex forming monomers and positively charged monomers. Examples of latex forming monomers that may be used to produce cationic latexes include, without limitation, vinyl aromatic monomers (e.g., styrene based monomers), ethylene, butadiene, vinylnitrile (e.g., acrylonitrile), olefinically unsaturated esters of $C_1$-$C_8$ alcohol, or combinations thereof. In some embodiments, nonionic monomers that exhibit steric effects and that contain long ethoxylate or hydrocarbon tails may also be present. Examples of positively charged monomers that may be used to produce cationic latexes include, without limitation those that already have a positive charge that cannot be neutralized at pH values greater than about 10, alternatively positively charged monomers which can be neutralized at pH values greater than about 10. Examples of the former monomer type include without limitation those containing quaternary ammonium groups, for example as in trimethylaminopropylmethacrylamide bromide or monomers containing other onium species such as trialkylsulfonium or tetraalkylphosphonium structures. Examples of the latter monomer type include without limitation protonated tertiary amine containing monomers, for example dimethylaminomethacrylamide which when polymerized in an acidic medium become cationic by protonation of amine nitrogen. Commercial examples of cationic latexes include without limitation ROADCHEM 600 or UP-65K, which are cationic styrene-butadiene latexes available from VSS Asphalt Technologies and Ultrapave respectively.

Methods for preparation of a cationic latex are known to one skilled in the art. For example, a cationic latex may be prepared by conventional emulsion polymerization using an azo initiator such as 2,2'-azobis(isobutylamidine hydrochloride). Alternatively, the cationic latex may be produced through the copolymerization of a latex with cationic or amine containing comonomers. Methods of preparing cationic latexes are disclosed in U.S. Pat. Nos. 4,791,161; 4,560,736; 3,108,979; and 3,399,159, each of which is incorporated by reference herein in its entirety.

In an embodiment, the SWLC comprises a stabilizer. The stabilizer may function to prevent the coagulation of the latex emulsion when contacted with the latex prior to contact of the latex with a salt. In an embodiment, any compound capable of preventing the coagulation of a latex emulsion when contacted with a salt and compatible with the other components of the SWLC may serve as the stabilizer. In an embodiment, the stabilizer is a surfactant. Examples of surfactants suitable for use in this disclosure include without limitation those comprising an ethoxylated nonylphenol, an alcohol ethoxylate sulfate, an alcohol sulfonate, a betaine, a sulatine or combinations thereof.

In an embodiment, the stabilizer may comprise a compound having the formula:

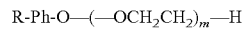

R-Ph-O—(—OCH$_2$CH$_2$)$_m$—H wherein R is an alkyl group having from 5 to 30 carbon atoms, Ph is phenylene and m is an integer in the range of from about 5 to about 50. In another embodiment, the stablilizer may comprise a compound having the formula:

R$_1$—(—OR$_2$)$_n$—SO$_3$X wherein R is selected from the group consisting of $C_1$-$C_{30}$ alkyl groups; $C_5$-$C_6$ cycloalkyl groups; $C_1$-$C_4$ alkyl substituted $C_5$-$C_6$ cycloalkyl groups; a phenyl group; alkyl substituted phenyl groups of the general formula $(R_3)_a$-Ph where Ph is phenylene, $R_3$ is a $C_1$-$C_{18}$ alkyl group and a is an integer of from 1 to 3; and phenyl (C₁-C₁₈) alkyl groups having a total of from about 8 to about 28 carbon atoms; $R_2$ is a substituted ethylene group of the formula —$CH_2CHR_4$ wherein $R_4$ is selected from hydrogen, methyl, ethyl or mixtures thereof; n is an integer from 0 to about 40 provided that when $R_1$ is phenyl or alkyl substituted phenyl, n is at least 1; and X is any compatible cation. In an embodiment, the stabilizer comprises a nonylphenol ethoxylated within the range of from about 20 to about 30 moles of ethylene oxide. An example of such a stabilizer includes without limitation 434B STABILIZER, latex stabilizer which is an ethoxylated nonylphenol commercially available from Halliburton Energy Services.

In another embodiment, the stabilizer may comprise an iso-dodecyl alcohol ether sulfate ethoxylated with from about 10 to about 20 moles of ethylene oxide. An example of which includes without limitation 434D STABILIZER latex stabilizer, which is a rubber latex stabilizing surfactant commercially available from Halliburton Energy Services.

In another embodiment, the stabilizer may comprise a compound having the formula:

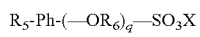

$$R_5\text{-Ph-}(—OR_6)_q—SO_3X$$

wherein $R_5$ is an alkyl group having in the range of from about 1 to about 9 carbon atoms, $R_6$ is the group —$CH_2CH_2$—, q is an integer from about 10 to about 20 and X is a compatible cation. In another embodiment, the stabilizer may comprise a sodium salt having the formula:

$$R_7—(—OR_8)_p—SO_3X$$

wherein $R_7$ is an alkyl group having in the range of from about 5 to about 20 carbon atoms, $R_8$ is the group —$CH_2CH_2$—, p is an integer in the range of from about 10 to about 40 and X is a compatible cation. Alternatively, the stabilizer comprises a compound having the formula:

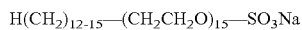

$$H(CH_2)_{12-15}—(CH_2CH_2O)_{15}—SO_3Na$$

Examples of such stabilizers include without limitation 434C STABILIZER latex stabilizer, which is an alcohol sulfonate commercially available from Halliburton Energy Services.

In an embodiment, the stabilizer comprises a betaine such as cocoamidopropyl betaine, alternatively the stabilizer comprises a sultaine such as cocoamidopropyl hydroxysulatine. Examples of such stabilizers include without limitation HC-2 surface-active suspending agent which is a zwitterionic surfactant commercially available from Halliburton Energy Services. Detailed descriptions of the disclosed stabilizers are given in U.S. Pat. No. 5,588,488 which is incorporated by reference herein in its entirety.

In an embodiment, the SWLC comprises cement. The SWLC may comprise cement such as hydraulic cement, which includes calcium, aluminum, silicon, oxygen, and/or sulfur and which sets and hardens by reaction with water. Examples of hydraulic cements include but are not limited to Portland cements (e.g., classes A, C, G, and H Portland cements), pozzolana cements, gypsum cements, phosphate cements, high alumina content cements, silica cements, high alkalinity cements, and combinations thereof.

In an embodiment, premixing of the latex and stabilizer prior to the introduction of an ionic compound prevents inversion of the latex in the SWLC. The ionic compound may be any compound chemically compatible with the other components of the SWLC and able to increase the ionic strength of the composition sufficiently to cause inversion of a latex solution. For example and without limitation the ionic compound may be a salt. It should be understood that throughout the present disclosure where the term salt is used other suitable ionic compounds may be substituted as would be appreciated by those skilled in the art. In an embodiment, the salt is an alkali halide, alternatively an alkaline halide. Examples of suitable salts include without limitation NaCl and KCl. In another embodiment, the salt is an organic salt such as for example and without limitation sodium oxolate, potassium acetate and lithium lactate. Alternatively, the salt is an inorganic salt such as for example and without limitation calcium nitrate and sodium silicate. Alternatively, the salt is introduced to the SWLC indirectly for example through the addition of an inorganic or organic acid which may produce excess ions in solution. Examples of such inorganic and organic acids include without limitation formic acid, glycolic acid, phosphoric acid and sulfuric acid.

In an embodiment, the SWLC includes salt and a sufficient amount of water to form a pumpable cementitious slurry. The water may be fresh water and the salt may be a solid (e.g., NaCl, $CaCl_2$, etc.), for example dry mixed with the cement. Alternatively, the water may be salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement. The SWLC may comprise a density from about 4 lb/gallon to about 23 lb/gallon. In alternative embodiments, the SWLC may comprise a density from about 12 lb/gallon to about 17 lb/gallon. In other alternative embodiments, the SWLC may be low-density cement composition with a density from about 6 lb/gallon to about 14 lb/gallon.

In some embodiments, additives may be included in the SWLC for improving or changing the properties thereof. Examples of such additives include but are not limited to salts, accelerants, surfactants, set retarders, defoamers, settling prevention agents, weighting materials, dispersants, formation-conditioning agents, water softeners or combinations thereof. Other mechanical property modifying additives, for example, are carbon fibers, glass fibers, metal fibers, minerals fibers, and the like which can be added to further modify the mechanical properties. These additives may be included singularly or in combination. Methods for introducing these additives and their effective amounts are known to one of ordinary skill in the art.

The SWLCs disclosed herein can be used for any suitable purpose. In an embodiment, the SWLC is used to service a wellbore that penetrates a subterranean formation, for example as a sealant composition in a wellbore. It is to be understood that "subterranean formation" encompasses both areas below exposed earth and areas below earth covered by water such as ocean or fresh water. Servicing a wellbore includes, without limitation, positioning the sealant composition (i.e., SWLC) disclosed herein in the wellbore to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; as a chemical packer to be used as a fluid in front of cement slurry in cementing operations; and to seal an annulus between the wellbore and an expandable pipe or pipe string. For instance, the SWLC may viscosify in a loss-circulation zone and thereby restore circulation. The viscosified mixture can set into a flexible, resilient and tough material, which may prevent further fluid losses when circulation is resumed. The SWLC disclosed herein may withstand substantial amounts of pressure, e.g., the hydrostatic pressure of a drilling fluid or cement slurry, without being dislodged or extruded.

The SWLC can also form a non-flowing, intact mass inside the loss-circulation zone. This mass plugs the zone and inhibits loss of subsequently pumped drilling fluid, which allows for further drilling. It is to be understood that, it may be desired to hasten the viscosification reaction for swift plugging of the voids. In another embodiment, it may be desired to prolong or delay the viscosification for deeper penetration into the voids.

In an embodiment, the SWLC is placed into a wellbore as a single stream and activated by downhole conditions to form a barrier that substantially seals loss circulation zones. In another embodiment, the SWLC may be constituted downhole as a two-stream combination. For example, one stream may comprise the homogenized solution of latex and stabilizer and a second stream may comprise the additional components of the sealant composition such as cement and saltwater. The first and second stream may be contacted downhole to form a sealant composition which provides the compressive strength and zonal isolation desired by the user. In such a process, the components of the sealant composition may be injected in aqueous or nonaqueous or combination fluids. Methods for introducing compositions into a wellbore to seal subterranean zones are described in U.S. Pat. Nos. 5,913,364; 6,167,967; and 6,258,757, each of which is incorporated by reference herein in its entirety.

In an embodiment, the SWLCs disclosed herein may be employed in well completion operations such as primary and secondary cementing operations. Said compositions may be placed into an annulus of the wellbore and allowed to set such that it isolates the subterranean formation from a different portion of the wellbore. The SWLC thus forms a barrier that prevents fluids in that subterranean formation from migrating into other subterranean formations. Within the annulus, the fluid also serves to support a conduit, e.g., casing, in the wellbore.

In an embodiment, the wellbore in which the SWLCa are positioned belongs to a multilateral wellbore configuration. It is to be understood that a multilateral wellbore configuration includes at least two principal wellbores connected by one or more ancillary wellbores. In secondary cementing, often referred to as squeeze cementing, the wellbore sealant composition disclosed herein may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth, thus acting as a sealant composition. Various procedures that may be followed to use a sealant composition in a wellbore are described in U.S. Pat. Nos. 5,346,012 and 5,588,488, which are incorporated by reference herein in their entirety.

In other embodiments, additives are also pumped into the wellbore with the SWLCs. For instance, fluid absorbing materials, particulate materials, organophilic clay, resins, aqueous superabsorbers, viscosifying agents, suspending agents, dispersing agents, fluid loss agents, mechanical property modifying agents such as fibers, elastomers or combinations thereof can be pumped in the stream with the compositions disclosed.

EXAMPLES

The invention having been generally described, the following examples are given as particular embodiments of the invention and to demonstrate the practice and advantages thereof. It is understood that the examples are given by way of illustration and are not intended to limit the specification or the claims in any manner.

Example 1

Cement slurries containing latex, stabilizer and other components as indicated in Table 1 were prepared.

TABLE 1

| COMPOSITION | | RUN 1 | RUN 2 | RUN 3 | RUN 4 | RUN 5 | RUN 6 | RUN 7 | RUN 7** | RUN 8 | RUN 9 |
|---|---|---|---|---|---|---|---|---|---|---|---|
| Cement* | lb | 94 | 94 | 94 | 94 | 94 | 94 | 94 | 94 | 94 | 94 |
| Water | | Sea | Sea | Sea | Sea | Sea | Sea | Sea | Sea | Sea | Sea |
| Sodium Carbonate | % bwow | | | 0.5 | 0.5 | | | | | | |
| SSA-1 | % bwoc | 35 | 35 | 35 | 35 | 35 | 35 | 35 | 35 | 35 | 35 |
| D-AIR 3000L | gal/sk | 0.03 | 0.03 | 0.03 | 0.03 | 0.03 | 0.03 | 0.03 | 0.03 | 0.03 | 0.03 |
| STABILIZER 434B | gal/sk | | 0.11 | | | | | | | | |
| STABILIZER 434D | gal/sk | 0.11 | | 0.11 | 0.11 | 0.10 | 0.10 | 0.10 | 0.10 | 0.10 | 0.10 |
| LATEX 2000 | gal/sk | 0.50 | 0.50 | 0.50 | 0.50 | 0.50 | 0.50 | 0.50 | 0.50 | 0.50 | 0.50 |
| FDP-C750 | gal/sk | 0.30 | 0.30 | 0.30 | | 0.50 | 0.50 | 0.50 | 0.50 | 0.50 | 0.50 |
| CFR-3L | gal/sk | | | | 0.30 | 0.35 | 0.35 | 0.35 | 0.35 | 0.35 | 0.35 |
| HALAD-413L | gal/sk | 0.30 | 0.30 | 0.30 | | 0.50 | 0.50 | 0.50 | 0.50 | 0.50 | 0.50 |
| HALAD-344L | gal/sk | | | | | | | | | | |
| HR-6L | gal/sk | 0.06 | 0.06 | 0.06 | | 0.30 | 0.30 | 0.50 | 0.50 | 0.15 | 0.20 |
| HR-25L | gal/sk | 0.02 | 0.02 | 0.02 | | 0.05 | | | | 0.05 | 0.06 |
| SCR-100L | gal/sk | | | | 0.15 | | | | | | |
| Water requirement: | gal/sk | 5.21 | 5.21 | 5.207 | 5.21 | 4.44 | 4.44 | 4.2404 | 4.2404 | 4.48 | 4.43 |
| Total Fluid: | gal/sk | 6.53 | 6.53 | 6.53 | 6.3 | 6.67 | 6.67 | 6.72 | 6.72 | 6.66 | 6.67 |
| Density | lb/gal | 15.8 | 15.8 | 15.8 | 15.8 | 15.8 | 15.8 | 15.8 | 15.8 | 15.8 | 15.8 |
| Slurry Yield: | cuft/sk | 1.551 | 1.551 | 1.553 | 1.521 | 1.57 | 1.57 | 1.58 | 1.58 | 1.57 | 1.57 |

*Cement used was Class G Portland cement with a specific gravity of 3.13
Run 7 is a repeat of Run 7

Seawater was the water source in all of the runs. The cement used was a Portland Cement Class G and sodium carbonate was used as a water softener. Both Class G Portland Cement and sodium carbonate are widely commercially available. SSA-1 silica flour is a particulate matter that was employed as a strengthening additive, D-AIR 3000L antifoaming agent is a defoamer, STABILIZER 434B and STABILIZER 434D are latex stabilizers, LATEX 2000 emulsion is a styrene/butadiene copolymer latex, FDP-C750 is a gel modifier, CFR-3L cement dispersant is a dispersing agent, HALAD 413L and 344L low water loss additives are fluid loss control additives, HR-6L, HR 25-L and SCR 100L are set retarders all of which are commercially available from Halliburton Energy Services.

The mechanical properties of the slurries prepared according to Table 1 were evaluated and these results are given in Table 2. In Runs 1-4 LATEX 2000 and the stabilizers were not premixed prior to the addition of saltwater and as a result the composition gelled and no further evaluation of mechanical properties could be performed. In Runs 5-9 the LATEX 2000 and the stabilizers were premixed prior to the addition of saltwater, and the resultant slurry was evaluated using standard oil field testing procedures.

defined as the period of time after the composition is placed into a wellbore annulus during which the pressure exerted on the subterranean formation by the cement composition is less than the pressure of the gas or water in the formation such that gas or water migration into the composition can occur. The transition time ends when the cement composition is sufficiently set such that gas or water may no longer migrate into the cement composition. The transition time is typically the time ranging from when the gel strength of the composition is about 100 lbf/100 ft$^2$ to when it is about 500 lbf/100 ft$^2$. Here an acceptable transition time was less than 30 minutes. Runs 7 and 7** show a transition time of less than 10 minutes well within the user required range.

TABLE 2

| | PROPERTIES | Requirement | RUN 1 | RUN 2 | RUN 3 | RUN 4 | Run 5 | RUN 6 | RUN 7 | RUN 7** | RUN 8 | RUN 9 |
|---|---|---|---|---|---|---|---|---|---|---|---|---|
| 1 | Thickening Time | Initial Bc | | | | | | | 30 | 9 | | |
| 2 | | 40 Bc | gelled | gelled | gelled | gelled | | | 1:12 | 3:17 | | |
| 3 | | 70 Bc | | 0:31 | 0:25 | 0:30 | >4:30 | 2:20 | 3:13 | 3:20 | 1:14 | 4:25 |
| 4 | | 100 Bc | | | | | | | 3:18 | 3:23 | | 4:25 |
| 5 | SGS | 100 SGS | | These four did not premix the latex and | | | | | 2:10 | 2:11 | | |
| 6 | | 500 SGS | | | stablizer | | | | 2:19 | 2:18 | | |
| 7 | Transistion time | <30 mins | | | | | | | 0:09 | 0:07 | | |
| 9 | Free Water | 45 Angle <1% | | | | | | | 0 | trace | | |
| 10 | Fluid Loss | <50 cc | | | | | | | 32 | 24 | | |
| 11 | Compressive Strength | Crush 2500 psi/2 hrs | | | | | | | 3360 | 3100 | | |
| 12 | Rheologies @ 180° F. | 3 rpm | | | | | | | 34 | 16 | | |
| 13 | | 6 rpm | | | | | | | 40 | 22 | | |
| 14 | | 100 rpm | | | | | | | 206 | 152 | | |
| 15 | | 200 rpm | | | | | | | 300+ | 258 | | |
| 16 | | 300 rpm | | | | | | | 300+ | 366 | | |
| 17 | | 600 rpm | | | | | | | | 500 | | |
| 18 | PV | | | | | | | | | 321 | | |
| 19 | YP | | | | | | | | | 47.925 | | |
| 20 | n' | | | | | | | | | 0.467 | | |
| 21 | k' | | | | | | | | | 1.564 | | |
| 22 | Rheologies @ 80° F. | 3 rpm | | | | | | | 14 | 16 | | |
| 23 | | 6 rpm | | | | | | | 20 | 20 | | |
| 24 | | 100 rpm | | | | | | | 137 | 132 | | |
| 25 | | 200 rpm | | | | | | | 236 | 228 | | |
| 26 | | 300 rpm | | | | | | | 300+ | 306 | | |
| 27 | | 600 rpm | | | | | | | | 532 | | |

In Table 2 column 1 lists the mechanical properties evaluated while column 2 labeled Requirements give the desired value for the property. The thickening time for the slurry compositions prepared in Runs 5 through 9 were determined and the values are given in Rows 1-4. The thickening time refers to the time required for the cement composition to achieve 70 Bearden units of Consistency (Bc). At about 70 Bc, the slurry undergoes a conversion from a pumpable fluid state to a non-pumpable paste. In row 1 the initial Bc is given, followed by the time to reach a Bc of 40,70 and 100 in Rows 2-4 respectively. Runs 7 and 7**where the latex and stabilizer were premixed all show an acceptable thickening time. In these examples an acceptable thickening time was in the range of 3 hours 10 minutes to 3 hours 50 minutes.

The time required to reach a static gel strength of 100 lbf/100 ft$^2$ and 500 lbf/100 ft$^2$ were determined and are given for each composition in Rows 5 and 6 respectively. The static gel strength refers to the stiffness of the slurry and can be determined by measuring the shear resistance of a slurry under downhole temperature and pressure while the slurry remains essentially static. Rows 5 and 6 show that only Runs 7 and 7** achieve the required static gel strengths of 100 and 500 lbf/100 ft$^2$ in approximately 2 hours.

In Row 7 the transition time for each slurry is given. As used herein, the transition time of a cement composition is The compressive strength requirement was set at 2500 psi for a slurry composition having been cured for 24 hours. The slurries prepared in Runs 7 and 7** show a compressive strength of greater than 3000 psi after 24 hours. The free water, fluid loss, and rheological values were all within the acceptable range. Free water is an indication of settling and the static stability of the slurry. Zero to trace free water indicates an extremely stable slurry. Fluid loss is a measure of the amount of water that may be lost to the formation. It is desirable to limit fluid loss so as to not alter the desired hydration of the cement. Additionally, a loss of fluid will result in a more viscous slurry which in turn may affect the ability to properly place the slurry in the well bore. The rheological data is collected to characterize the rheological behavior of the cement slurry. The rheological values give an indication of the pumping needs as well as the equivalent circulating densities necessary to properly place the slurry in a well bore.

The results demonstrate the formation of a salt-water stable latex cement slurry with premixing of the latex and stabilizer. The slurries having a premixed latex and stabilizer solution did not coagulate when contacted with saltwater; developed an appreciable compressive strength and displayed a desired thickening and transition time along with other favorable rheological properties.

Example 2

Additional slurries of the composition given in Table 3 were prepared and the effect of the order of addition of slurry components on the latex stability determined.

TABLE 3

| SLURRY COMPOSITION | SLURRY 1 (30% NaCl) | SLURRY 2 (37.2% NaCl) |
|---|---|---|
| WATER | 35.59% bwoc | 35.62 bwoc |
| CEMENT CLASS G | 100% bwoc | 100% bwoc |
| SSA-2 | 35% bwoc | 35% bwoc |
| HI-DENSE #3 | 33% bwoc | 33% bwoc |
| HALAD 413 | 1% bwoc | 1% bwoc |
| NaCl | 30% bwoc | 37.2% bwoc |
| CFR-3 | 2.5% bwoc | 2.5% bwoc |
| LATEX 2000 | 1.0% gal/sk | 1.0% gal/sk |
| STABILIZER 434D | 0.25 gal/sk | 0.025 gal/sk |
| DAIR 3000L | 0.03 gal/sk | 0.03 gal/sk |

The water source for each slurry was fresh water. HI-DENSE is hematite ore weighting additive, SSA-2 silica flour is a particulate matter that was employed as a strengthening additive, D-AIR 3000L antifoaming agent is a defoamer, STABILIZER 434D is a latex stabilizers, LATEX 2000 emulsion is a styrene/butadiene copolymer latex, CFR-3 cement dispersant is a dispersing agent and, HALAD 413L low water loss additives is a fluid loss control additive, all of which are commercially available from Halliburton Energy Services.

Slurry 1 was prepared by procedure 1, and slurry 2 was prepared by procedure 2. In procedure 1, LATEX 2000 and STABILIZER 434D were added to the fresh mix water before adding any other components. The latex, stabilizer and water were premixed to form a homogeneous solution and the rest of the liquid components were then added to the mix water. Subsequently, all of the solid additives were dry blended and added to the mix water. In procedure 2, LATEX 2000 and STABILIZER 434D were premixed to homogeneity in a separate container before being added to the mix water. Then the rest of the liquid components were added to the mix water. Subsequently, all of the solid additives were dry blended and added to the mix water. No significant differences were observed in the product formed when using either procedure 1 or procedure 2. In both cases a pumpable slurry was formed having a density of 17.9 ppg. In the case of Slurry 1 the thickening time was 10 minutes 18 seconds while for Slurry 2 the thickening time was 8 minutes 27 seconds.

The results demonstrate the formation of a pumpable latex containing cement slurry in the presence of high levels of salt when the latex and stabilizer are premixed. The addition of dry salt to the premixed latex and stabilizer solution does not prevent the development of a cement slurry having user desired properties.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore comprising:
   (a) preparing a cement slurry by premixing at least one latex and at least one stabilizer to form a homogeneous solution;
   (b) further mixing the homogeneous solution with an ionic compound, cement, and water to form the slurry; and
   (c) placing the slurry in the wellbore.

2. The method of claim 1 wherein the latex comprises a styrene/butadiene copolymer suspended in water to form an aqueous emulsion, a colloidally stabilized latex, an alkali swellable latex and at least one pH increasing material, at least polar monomer and at least one elasticity enhancing monomer, a cationic latex or combinations thereof.

3. The method of claim 1 wherein the stabilizer comprises a compound having the formula R-Ph-O—($-OCH_2CH_2)_m$—H, wherein R is an alkyl group having from 5 to 30 carbon atoms, Ph is phenylene and m is an integer in the range of from about 5 to about 50.

4. The method of claim 1 wherein the stabilizer comprises a compound having the formula $R_1$—($-OR_2)_n$—$SO_3X$, wherein $R_1$ is selected from the group consisting of $C_1$-$C_{30}$ alkyl groups; $C_5$-$C_6$ cycloalkyl groups; $C_1$-$C_4$ alkyl substituted $C_5$-$C_6$ cycloalkyl groups; a phenyl group; alkyl substituted phenyl groups of the general formula $(R_3)_a$-Ph where Ph is phenylene, $R_3$ is a $C_1$-$C_{18}$ alkyl group and a is an integer of from 1 to 3; and phenyl ($C_1$-$C_{18}$) alkyl groups having a total of from about 8 to about 28 carbon atoms; $R_2$ is a substituted ethylene group of the formula —$CH_2CHR_4$ wherein $R_4$ is selected from hydrogen, methyl, ethyl or mixtures thereof n is an integer from 0 to about 40 provided that when $R_1$ is phenyl or alkyl substituted phenyl, n is at least 1; and X is any compatible cation.

5. The method of claim 1 wherein the stabilizer comprises a nonylphenol ethoxylated within the range of from about 20 to about 30 moles of ethylene oxide; an iso-dodecyl alcohol ether sulfate ethoxylated with from about 10 to about 20 moles of ethylene oxide; or combinations thereof 6. The method of claim 1 wherein the stabilizer comprises a compound having the formula $R_5$-Ph-($-OR_6)_q$—$SO_3X$, wherein $R_5$ is an alkyl group having in the range of from about 1 to about 9 carbon atoms, $R_6$ is the group —$CH_2CH_2$—, q is an integer from about 10 to about 20 and X is a compatible cation.

7. The method of claim 1 wherein the stabilizer is a sodium salt of a compound having the formula $R_7$—($-OR_8)_p$—

$SO_3X$, wherein $R_7$ is an alkyl group having in the range of from about 5 to about 20 carbon atoms, $R_8$ is the group $-CH_2CH_2-$, p is an integer in the range of from about 10 to about 40 and X is a compatible cation.

8. The method of claim 1 wherein the stabilizer comprises a compound having the formula $H(CH_2)_{12-15}-(CH_2CH_2O)_{15}-SO_3Na$.

9. The method of claim 1 wherein the stabilizer comprises an ethoxylated nonylphenol, an alcohol ethoxylate sulfate, an alcohol sulfonate, a betaine, a sulatine or combinations thereof.

10. The method of claim 1 wherein the homogeneous solution is contacted with all or a portion of the water prior to contact with the premixed salt and cement.

11. The method of claim 1 wherein the stabilizer is present in an amount of from about 10% to about 90% by volume of latex.

12. The method of claim 1 wherein the stabilizer is present in an amount of from about 10% to about 25% by volume of latex.

13. A method of stabilizing latex in a cement slurry containing saltwater, comprising premixing the latex with a stabilizer until a homogenous solution forms prior to contacting the latex with the saltwater, wherein the cement slurry is prepared by premixing a cement with a solid ionic compound prior to formation of the slurry.

14. The method of claim 13 wherein the stabilizer an ethoxylated nonylphenol, an alcohol ethoxylate sulfate, an alcohol sulfonate, a betaine, a sulatine or combinations thereof.

15. A cement slurry comprising a latex, a stabilizer, a cement, an ionic compound, and water, wherein the latex and stabilizer are premixed to form a homogeneous solution prior to formation of the slurry.

16. The slurry of claim 15 wherein the latex comprises a styrene/butadiene copolymer suspended in water to form an aqueous emulsion, a colloidally stabilized latex, an alkali swellable latex and at least one pH increasing material, at least polar monomer and at least one elasticity enhancing monomer, a cationic latex or combinations thereof.

17. The slurry of claim 15 wherein the stabilizer comprises an ethoxylated nonylphenol, an alcohol ethoxylate sulfate, an alcohol sulfonate, a betaine, a sulatine or combinations thereof.

18. The slurry of claim 15 wherein the ionic compound is an organic salt, an inorganic salt, an organic acid wherein the addition of the organic acid generates excess ions in solution, an inorganic acid wherein the addition of the inorganic acid generates excess ions in solution or combinations thereof.

19. The method of claim 1 wherein the ionic compound is an organic salt, an inorganic salt, an organic acid wherein the addition of the organic acid generates excess ions in solution, an inorganic acid wherein the addition of the inorganic acid generates excess ions in solution or combinations thereof.

20. The slurry of claim 15 having a transition time of less than 10 minutes.

21. The slurry of claim 15 having a compressive strength of greater than about 3000 psi.

* * * * *

UNITED STATES PATENT AND TRADEMARK OFFICE
CERTIFICATE OF CORRECTION

PATENT NO.        : 7,576,042 B2
APPLICATION NO. : 11/364092
DATED             : August 18, 2009
INVENTOR(S)       : Lewis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 447 days.

Signed and Sealed this

Seventh Day of September, 2010

David J. Kappos
*Director of the United States Patent and Trademark Office*